(12) United States Patent
Kontz et al.

(10) Patent No.: US 8,812,233 B2
(45) Date of Patent: Aug. 19, 2014

(54) ERROR DETECTION FOR INERTIAL MEASUREMENT UNITS

(75) Inventors: Matthew E. Kontz, Chillicothe, IL (US); Harold Duane Dabbs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 13/337,414

(22) Filed: Dec. 27, 2011

(65) Prior Publication Data

US 2013/0160543 A1 Jun. 27, 2013

(51) Int. Cl.
  *G01C 21/26* (2006.01)
  *G01P 15/18* (2013.01)

(52) U.S. Cl.
  USPC ........... 701/505; 701/502; 701/518; 702/104; 702/141; 73/504.03; 73/510

(58) Field of Classification Search
  USPC ............... 73/504.03, 510; 701/500, 502, 505, 701/518; 702/104, 141
  See application file for complete search history.

(56) References Cited

U.S. PATENT DOCUMENTS

| | | | | |
|---|---|---|---|---|
| 4,254,465 A * | 3/1981 | Land | ............................. | 701/505 |
| 4,280,188 A | 7/1981 | Weinstein et al. | | |
| 5,150,856 A * | 9/1992 | Gaide | ............................. | 244/3.2 |
| 5,301,114 A | 4/1994 | Mitchell | | |
| 7,237,169 B2 | 6/2007 | Smith | | |
| 7,337,668 B2 * | 3/2008 | Condemine et al. | ............ | 73/509 |
| 7,650,253 B2 * | 1/2010 | Weed et al. | .................... | 702/104 |
| 7,805,245 B2 | 9/2010 | Bacon et al. | | |
| 8,311,739 B2 * | 11/2012 | Huddle | ......................... | 701/469 |
| 8,397,570 B2 * | 3/2013 | Verjus et al. | .................... | 73/510 |
| 2007/0100550 A1 | 5/2007 | Hawkinson | | |
| 2007/0119252 A1 * | 5/2007 | Adams et al. | ................... | 73/510 |
| 2008/0109141 A1 * | 5/2008 | Nichols et al. | .................. | 701/50 |
| 2008/0143675 A1 * | 6/2008 | Hsieh et al. | .................... | 345/158 |
| 2010/0109950 A1 | 5/2010 | Roh | | |
| 2010/0152946 A1 * | 6/2010 | Koch | .............................. | 701/29 |
| 2010/0299003 A1 | 11/2010 | Hanson et al. | | |
| 2011/0172854 A1 | 7/2011 | Barker | | |
| 2011/0172950 A1 | 7/2011 | Brady et al. | | |
| 2012/0016623 A1 * | 1/2012 | Hayner | ......................... | 702/141 |

FOREIGN PATENT DOCUMENTS

EP 621482 A1 * 10/1994
JP 10-2005-0003709 A 1/2005

* cited by examiner

*Primary Examiner* — David A Rogers
(74) *Attorney, Agent, or Firm* — Finnegan, Henderson, Farabow, Garrett & Dunner LLP

(57) ABSTRACT

A system for detecting an error in an inertial measurement unit (IMU) is disclosed. The system may have a first IMU including a first plurality of accelerometers and a first rotational rate measurer. The first plurality of accelerometers may be configured to measure acceleration along a plurality of first axes, a first axis of the plurality of first axes being substantially collinear with a collinear axis. The first rotational rate measurer may be configured to measure a first rotational rate about a second axis of the plurality of first axes that is substantially perpendicular to the collinear axis. The system may also have a second IMU and an IMU error detector. The IMU error detector may be configured to receive measurement data from the first IMU and the second IMU; and detect an error based on the measurement data.

19 Claims, 4 Drawing Sheets

ERROR DETECTION FOR INERTIAL MEASUREMENT UNITS

TECHNICAL FIELD

The present disclosure relates generally to methods and systems for error detection and more particularly, to methods and systems for detecting errors in one or more inertial measurement units.

BACKGROUND

Inertial measurement units (IMUs) may be incorporated into a wide variety of machines that may travel by land, air, or sea. In some applications one or more IMUs may be used to measure data such as orientation, velocity, rotational velocity, and acceleration of a machine, for example. This data may be input to various systems ranging from navigation and dead reckoning to anti-lock braking and dynamic stability control to any other type of control system for a machine.

Because such systems may be used to control various aspects of the machine, it is important to ensure the data received from the IMUs is accurate and to determine when one or more IMUs is sending inaccurate data. Otherwise, the inaccurate data may cause the systems to operate in an undesirable manner, causing poor machine performance or even failure. For example, if IMUs connected to a machine such as an autonomous or semi-autonomous machine send inaccurate data to a navigation or dead reckoning system, the machine may move in an undesirable manner, e.g. by drifting off course, rolling over, etc. Accordingly, it is helpful to analyze the outputs from the IMUs to ensure that the data is accurate, and to generate notifications or otherwise implement corrective actions when the data is inaccurate or when an IMU is malfunctioning.

An exemplary system that may be used to detect errors in one or more IMUs is disclosed in U.S. Patent Application Publication No. 2011/0172950 to Brady et al. that published on Jul. 14, 2011 (the '950 publication). The system in the '950 publication includes two IMUs and a sensor system with multiple sensors that provide rate data in three directions. The '950 publication compares data streams from the two IMUs, and, if the data streams are different, compares each of the data streams to the sensor outputs to determine which, if any, of the two IMUs failed.

Although the system of the '950 publication may be useful for detecting errors in one or more IMUs, merely comparing the data streams to determine if one data stream differs from another may not account for the different physical placements of the IMUs on a machine. For example, two IMUs that are placed apart from each other on a machine may output different data streams based on, e.g., their physical placement and the rotation of the machine in one or more directions, even though both IMUs are functioning properly. Moreover, any attempt to account for such different physical placement may cause the computations in the system of the '950 publication to become complicated, slowing down the system. Still further, the system of the '950 publication requires two IMUs plus additional sensors to identify an error and implement corrective action. These additional sensors increase the cost and complexity of the system in the '950 publication.

The disclosed error detection system is directed to overcoming one or more of the problems set forth above and/or other problems of the prior art.

SUMMARY

In one aspect, the present disclosure is directed to a system for detecting an error in an inertial measurement unit. The system may include a first inertial measurement unit, a second inertial measurement unit, and an inertial measurement unit error detector. The first inertial measurement unit may include a first plurality of accelerometers configured to measure acceleration along a plurality of first axes, a first axis of the plurality of first axes being substantially collinear with a collinear axis, and a first rotational rate measurer configured to measure a first rotational rate about a second axis of the plurality of first axes that is substantially perpendicular to the collinear axis. The second inertial measurement unit may include a second plurality of accelerometers configured to measure acceleration along a plurality of second axes, a first axis of the plurality of second axes being substantially collinear with the collinear axis, and a second rotational rate measurer configured to measure a second rotational rate about a second axis of the plurality of second axes that is substantially perpendicular to the collinear axis. The inertial measurement unit error detector may be configured to receive measurement data from the first inertial measurement unit and the second inertial measurement unit, and detect an error based on the measurement data.

In another aspect, the present disclosure is directed to a method for detecting an error in an inertial measurement unit. The method may include receiving first measurement data from a first inertial measurement unit, the measurement data including first acceleration data in first, second, and third directions and first rotational rate data. The method may also include receiving second measurement data from a second inertial measurement unit that is separated by a distance from the first inertial measurement unit, the second measurement data including second acceleration data in the first, second, and third directions and a second rotational rate data. The method may also include determining whether an error has occurred in the first or second inertial measurement units using the first and second acceleration data, the first and second rotational rate data, and the distance between the first inertial measurement unit and the second inertial measurement unit.

In yet another aspect, the present disclosure is directed to a system for detecting an error in an inertial measurement unit comprising. The system may include a first inertial measurement unit that generates first acceleration data in first, second, and third directions and first rotational rate data, and second inertial measurement unit that is separated by a distance from the first inertial measurement unit and that generates second acceleration data in the first, second and third directions and second rotational rate data. The system may also include an error detector configured to receive the first acceleration data and the first rotational rate data from the first inertial measurement unit and the second acceleration data and the second rotational rate data from the second inertial measurement unit. The error detector may further be configured to determine whether an error has occurred using the first and second acceleration data, the first and second rotational rate data, and the distance between the first inertial measurement unit and the second inertial measurement unit.

DETAILED DESCRIPTION

Figure 1A:
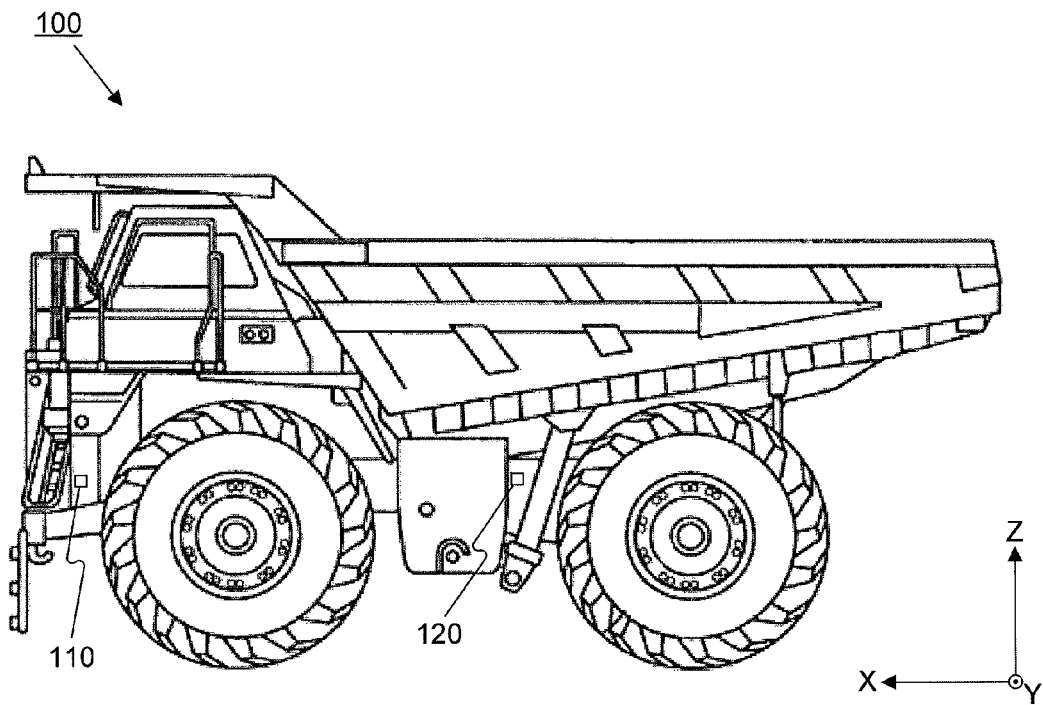
FIGS. 1A and 1B are pictorial illustrations of an exemplary disclosed machine.
Figure 1B:
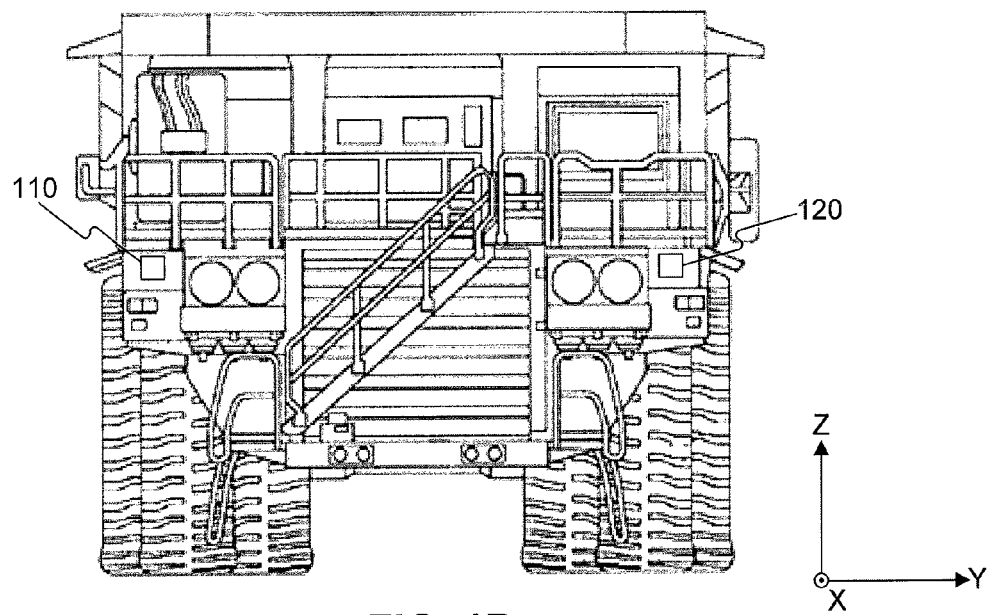

FIGS. 1A and 1B illustrate a machine 100 having a first inertial measurement unit (IMU) 110 and a second IMU 120. Machine 100 may embody a machine configured to perform an operation associated with an industry such as mining, construction, farming, transportation, or any other industry known in the art. For example, machine 100 may be an earth moving machine such as a haul truck, a dozer, a loader, a backhoe, an excavator, a motor grader, a wheel tractor scraper, or any other earth moving machine.

IMUs 110 and 120, described in greater detail below, may include one or more sensors, e.g., accelerometers, inclinometers, gyroscopes, etc., to measure data used for determining an orientation, velocity, rotational velocity, acceleration, etc., of machine 100. This data may be input to various systems ranging from navigation and dead reckoning to anti-lock braking and dynamic stability control to any other type of control system for machine 100. In certain embodiments, each of IMUs 110 and 120 may include three accelerometers that each measures an acceleration of machine 100 along an axis corresponding to the accelerometer and one gyroscope that measures a rotational rate (i.e. angular velocity) of machine 100 about an axis.

IMUs 110 and 120 may be incorporated into an error detection system (not shown) of machine 100. The error detection system may determine whether an error has occurred in one or more of IMUs 110 and 120. In certain embodiments, the error detection system may determine whether an error has occurred using the input from IMUs 110 and 120, and from no other IMUs or sensors. For example, the error detection system may determine whether an error has occurred based on the outputs from the three accelerometers and the one gyroscope of each of IMUs 110 and 120. In one embodiment, the error detection system may be incorporated into an electronic control unit (ECU) of machine 100. The error detection system is discussed in greater detail below with regard to FIG. 3.

FIGS. 1A and 1B illustrate IMUs 110 and 120 in two exemplary orientations with respect to machine 100. For example, as shown in FIG. 1A, IMUs 110 and 120 may be positioned on machine 100 such that first IMU 110 and second IMU 120 are substantially collinear along an axis substantially parallel to the direction of forward movement of machine 100 (shown in FIG. 1A as the x-axis). Moreover, as shown in FIG. 1B, IMUs 110 and 120 may be positioned on machine 100 such that first IMU 110 and second IMU 120 are substantially collinear along an axis that is substantially perpendicular to the direction of forward movement of machine 100. For example, in FIG. 1B, first IMU 110 and second IMU 120 may be collinear along the y-axis as shown in FIG. 1B. While not shown in FIGS. 1A and 1B, IMUs 110 and 120 may also be collinear along the z-axis. Of course, variation in production and machine design may inhibit first IMU 110 and second IMU 120 from being precisely collinear about such axes. Accordingly, in certain embodiments, first IMU 110 and second IMU 120 that are substantially collinear to such axes may have an angular variation, e.g., of 7.5 degrees or less.

In both of the orientations shown in FIGS. 1A and 1B, IMUs 110 and 120 may be positioned such that they are substantially level with respect to the z-axis. For example, IMUs 110 and 120 may be positioned on machine 100 such that an angular variation between them in a direction perpendicular to the axis along which they are collinear is less than or equal to 7.5 degrees. In FIG. 1A, this angular variation may be measured with respect to the y-axis and/or the z-axis. In FIG. 1B, this angular variation may be measured with respect to the x-axis or the z-axis.

Figure 2A:
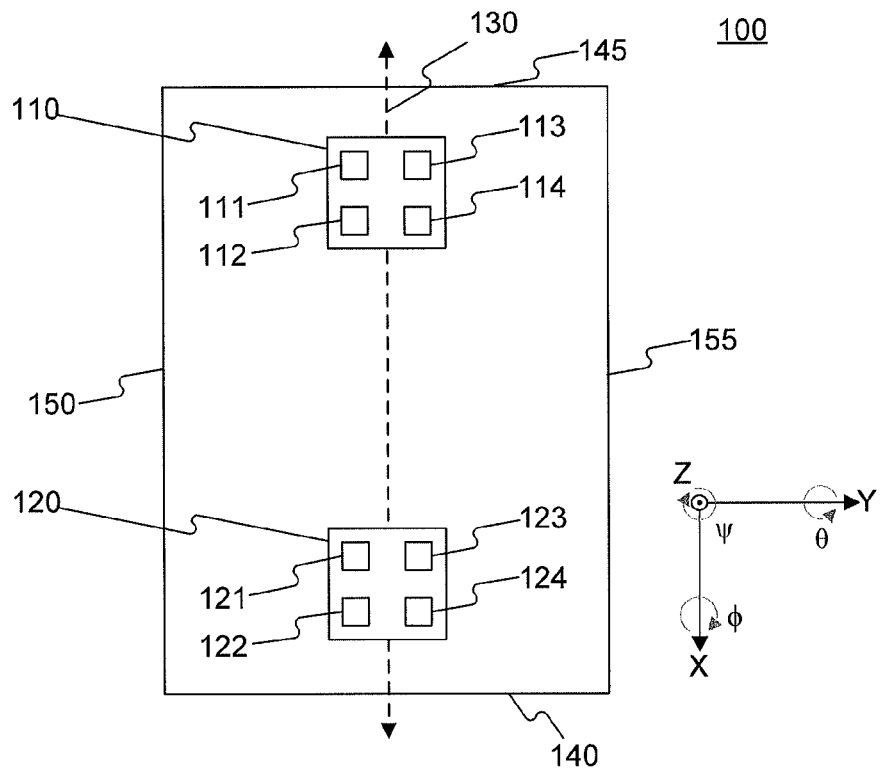
FIGS. 2A and 2B are diagrammatic illustrations illustrating the orientation of IMUs that may be used in conjunction with the machine of FIG. 1.
Figure 2B:
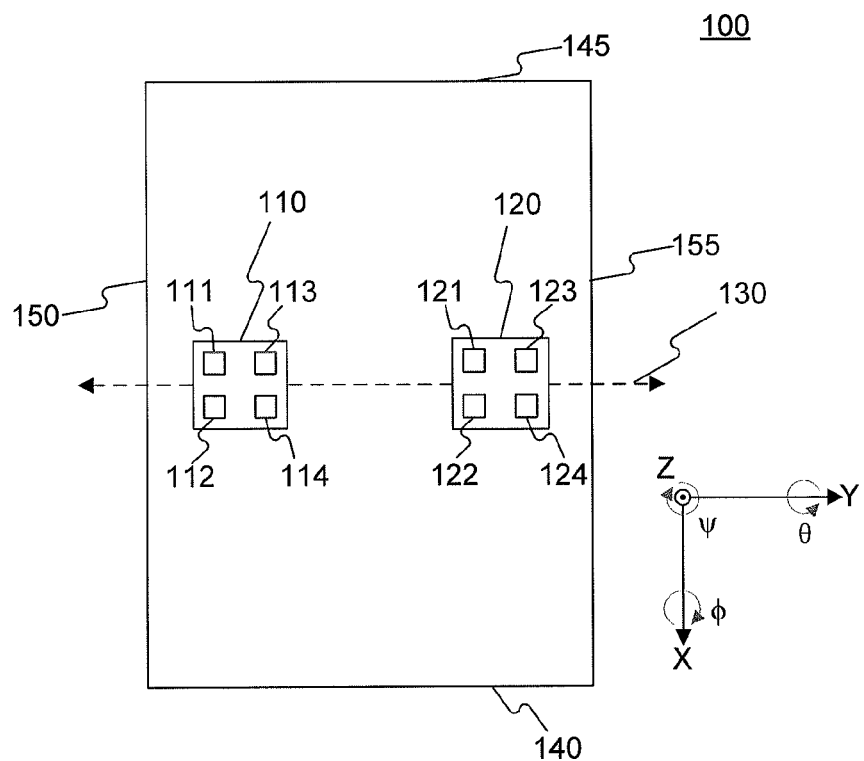

FIGS. 2A and 2B are diagrammatic illustrations illustrating orientations of IMUs 110 and 120 that may be used in conjunction with machine 100. For example, FIGS. 2A and 2B may represent top-views of machine 100, with FIG. 2A corresponding to FIG. 1A and FIG. 2B corresponding to FIG. 1B. Those skilled in the art will appreciate that FIGS. 2A and 2B are not necessarily to scale, and that the relative size of IMUs 110 and 120 to machine 100 may vary.

In FIGS. 2A and 2B, machine 100 includes a front side 140, a rear side 145, a right side 150, and a left side 155. Machine 100 also includes first IMU 110 and second IMU 120 positioned to be substantially collinear with each other along a collinear axis 130. For example, in FIG. 2A, collinear axis 130 is substantially parallel to a direction of forward movement of machine 100, e.g., the x-axis. On the other hand, in FIG. 2B, collinear axis 130 is substantially perpendicular to the direction of forward movement of machine 100. For example, in FIG. 2B, collinear axis 130 is substantially parallel to the y-axis. However, those skilled in the art will appreciate that IMUs 110 and 120 may also be positioned such that collinear axis 130 is substantially parallel to the z-axis.

FIGS. 2A and 2B illustrate IMUs 110 and 120 positioned such that collinear axis 130 substantially bisects machine 100. That is, in FIG. 2A, collinear axis 130 is approximately equidistant from sides 150 and 155. Similarly, in FIG. 2B, collinear axis 130 is approximately equidistant from sides 140 and 145. However, those skilled in the art will appreciate that IMUs 110 and 120 may be positioned such that collinear axis 130 does not substantially bisect machine 100. For example, in FIG. 2A collinear axis 130 may be closer to one of right side 150 or left side 155 and in FIG. 2B collinear axis 130 may be closer to one of front side 140 or rear side 145.

First IMU 110 may include a first x-axis accelerometer 111, a first y-axis accelerometer 112, a first z-axis accelerometer 113, and a first rotational rate sensor 114. First x-axis accelerometer 111 may measure an acceleration of machine 100 in a direction of the x-axis. First y-axis accelerometer 112 may measure an acceleration of machine 100 in a direction of the y-axis. First z-axis accelerometer 113 may measure an acceleration of machine 100 in a direction of the z-axis. First rotational rate sensor 114 may include, e.g., one or more gyroscopes to measure a first rotational rate. The first rotational rate may be about an axis substantially perpendicular to collinear axis 130. For example, in FIG. 2A, the first rotational rate may be a yaw rate $\dot{\psi}$ about the z-axis or a pitch rate $\dot{\theta}$ about the y-axis with respect to first IMU 110. Similarly, in FIG. 2B, the first rotational rate may be a yaw rate $\dot{\psi}$ about the z-axis or a roll rate $\dot{\phi}$ about the x-axis with respect to first IMU 110.

Second IMU 120 may include a second x-axis accelerometer 121, a second y-axis accelerometer 122, a second z-axis accelerometer 123, and a second rotational rate sensor 114. Second x-axis accelerometer 121 may measure an acceleration of machine 100 in a direction of the x-axis. Second y-axis accelerometer 122 may measure an acceleration of machine 100 in a direction of the y-axis. Second z-axis accelerometer 123 may measure an acceleration of machine 100 in a direction of the z-axis. Second rotational rate sensor 124 may include, e.g., one or more gyroscopes to measure a second rotational rate. The second rotational rate may be about an axis substantially perpendicular to collinear axis 130. For example, in FIG. 2A, the second rotational rate may be a yaw rate $\dot{\psi}$ about the z-axis or a pitch rate $\dot{\theta}$ about the y-axis with respect to second IMU 120. Similarly, in FIG. 2B, the second rotational rate may be a yaw rate $\dot{\psi}$ about the z-axis or a roll rate $\dot{\phi}$ about the x-axis with respect to second IMU 120.

In certain embodiments, the first rotational rate and the second rotational rate are measured about different axes. Moreover, the first rotational rate and the second rotational rate may be measured about axes that are substantially perpendicular to each other. For example, in FIG. 2A, the first rotational rate measured by first rotational rate sensor 114 may be a yaw rate $\dot{\psi}$ about the z-axis with respect to first IMU 110 and the second rotational rate measured by second rotational rate sensor 124 may be a pitch rate $\dot{\theta}$ about the y-axis with respect to second IMU 120, and vice versa. Likewise, in FIG. 2B, the first rotational rate measured by first rotational rate sensor 114 may be a yaw rate $\dot{\psi}$ about the z-axis with respect to first IMU 110 and the second rotational rate measured by second rotational rate sensor 124 may be a roll rate $\dot{\theta}$ about the x-axis with respect to second IMU 120, and vice versa.

While the axes in FIGS. 2A and 2B are shown as having the x-axis being substantially parallel to a direction of forward motion of machine 100, those skilled in the art will appreciate that the axes may be shifted and/or rotated in any way. That is, while IMUs 110 and 120 include accelerometers in directions substantially parallel and substantially perpendicular to a direction of forward motion of machine 100, IMUs 110 and 120 may measure acceleration along any axis and rotational rate about any axis.

Figure 3:
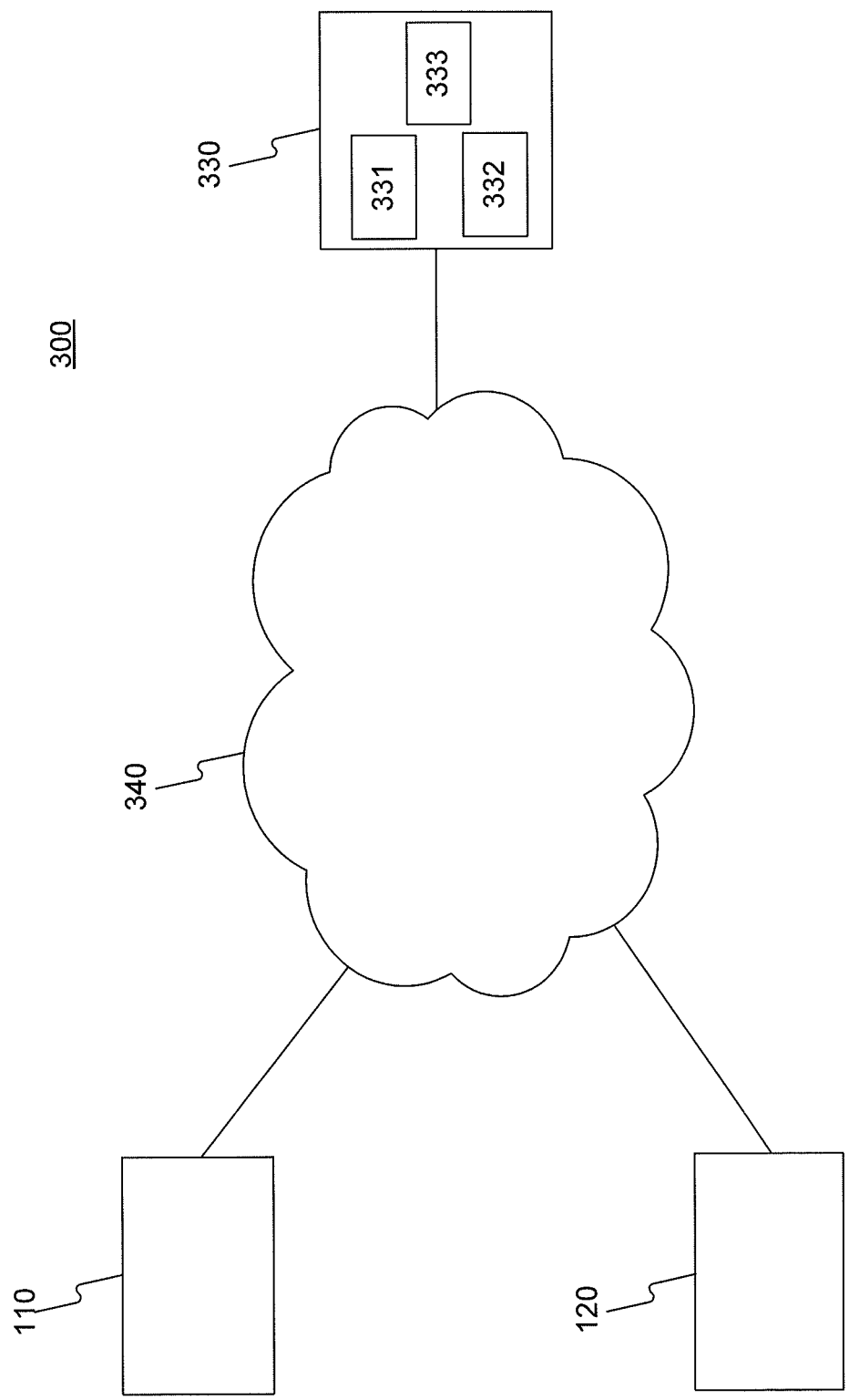
FIG. 3 is a diagrammatic illustration of an exemplary disclosed IMU error detection system that may be used in conjunction with the machine of FIG. 1.

FIG. 3 is a diagrammatic illustration of an exemplary disclosed IMU error detection system 300 that may be used in conjunction with the machine of FIG. 1. As shown in FIG. 3, IMU error detection system 300 may include first IMU 110 and second IMU 120 connected to an error detector 330 via a network 340. First IMU 110 and second IMU 120 may be positioned on machine 100 in one of the orientations discussed above with regard to FIGS. 1A-2B, for example.

Error detector 330 may include a processor 331, a storage 332, and a memory 333, included together in a single device and/or provided separately. Processor 331 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 333 may include one or more storage devices configured to store information used by error detector 330 to perform certain functions related to disclosed embodiments. Storage 332 may include a volatile or non-volatile, magnetic, semiconductor, tape, optical, removable, nonremovable, or other type of storage device or computer-readable medium. Storage 332 may store programs and/or other information, such as information related to processing data received from IMUs 110 and 120, as discussed in greater detail below.

In one embodiment, memory 333 may include one or more IMU error detection programs or subprograms loaded from storage 332 or elsewhere that, when executed by processor 331, perform various procedures, operations, or processes consistent with disclosed embodiments. For example, memory 333 may include one or more programs that enable error detector 330 to, among other things, receive measurement data from IMUs 110 and 120, process the data according to disclosed embodiments, such as those discussed below, and determine whether an error has occurred in one or more of IMUs 110 and 120 based on the processed measurement data.

In certain embodiments, memory 333 may include an IMU error detection program enabling error detector 330 to receive first acceleration data and first rotational rate data from the first inertial measurement unit and second acceleration data and second rotational rate data from the second inertial measurement unit and determine whether an error has occurred using the first and second acceleration data, the first and second rotational rate data, and a distance between the first inertial measurement unit and the second inertial measurement unit.

Network 340 may include any one of or combination of wired or wireless networks. For example, network 340 may include wired networks such as twisted pair wire, coaxial cable, optical fiber, and/or a digital network. Network 340 may further include any network configured to enable communication using a CAN-bus protocol. Likewise, network 340 may include any wireless networks such as RFID, microwave or cellular networks or wireless networks employing, e.g., IEEE 802.11 or Bluetooth protocols. Additionally, network 340 may be integrated into any local area network, wide area network, campus area network, or the Internet.

As discussed above, error detector 330 may determine whether an error has occurred by receiving and processing measurement data from IMUs 110 and 120. However, as shown in FIGS. 1A-2B, IMUs 110 and 120 may be separated by a non-zero distance. For example, if machine 100 is an earth moving machine, as shown in FIGS. 1A-1B, the distance between IMUs 110 and 120 may be, e.g., 0.5 meters or even greater. Thus, determining whether an error has occurred in one or more of IMUs 110 and 120 by merely subtracting or comparing the acceleration values measured from each IMU may result in unsatisfactory error detection, because the difference between the acceleration at first IMU 110 and at second IMU 120 may be a non-zero value, due to the distance between IMUs 110 and 120 and a rotational rate and/or rotational acceleration of machine 100. Specifically, the relationship between the acceleration of first IMU 110 and second IMU 120 may be expressed as:

$$\vec{A}_2 - \vec{A}_1 = \qquad (1)$$
$$\dot{\vec{\omega}} \times \vec{r}_{12} + \vec{\omega} \times (\vec{\omega} \times \vec{r}_{12}) = (\ddot{\phi}\hat{i} + \ddot{\theta}\hat{j} + \ddot{\psi}\hat{k}) \times (r_x\hat{i} + r_y\hat{j} + r_z\hat{k}) + \ldots$$
$$(\dot{\phi}\hat{i} + \dot{\theta}\hat{j} + \dot{\psi}\hat{k}) \times ((\dot{\phi}\hat{i} + \dot{\theta}\hat{j} + \dot{\psi}\hat{k}) \times (r_x\hat{i} + r_y\hat{j} + r_z\hat{k}))$$

where $\vec{A}_2$ is an acceleration vector representing the acceleration values measured by second IMU 120, $\vec{A}_1$ is an acceleration vector representing the acceleration values measured by first IMU 110, and $\vec{r}_{12}$ is a distance vector from first IMU 110 to second IMU 120 that may be represented as its x-, y-, and z-components as $r_x\hat{i} + r_y\hat{j} + r_z\hat{k}$. Also, $\vec{\omega}$ represents a rotational rate vector for machine 100. As can be seen from equation (1), $\vec{\omega}$ can be represented as x-, y-, and z-components as $\dot{\phi}\hat{i} + \dot{\theta}\hat{j} + \dot{\psi}\hat{k}$. Generally, a single dot over a variable represents its derivative, while a double dot represents its second derivative. Thus, $\phi$ represents a roll position of machine 100, $\dot{\phi}$ represents a roll rate, and $\ddot{\phi}$ represents a roll acceleration, or the derivative of the roll rate.

As can be seen from equation (1) above, determining whether an error has occurred by comparing the accelerations measured by first IMU 110 and second IMU 120 may be computationally expensive, because the comparison requires values for roll rate, yaw rate, and pitch rate, as well as the derivatives of each rate. Calculating the derivatives may be computationally expensive, and, as discussed above, IMUs 110 and 120 may only measure two of the three rotational rates. However, equation (1) may be simplified by positioning first IMU 110 and second IMU 120 as shown in FIGS. 2A and 2B.

For example, positioning first IMU 110 and second IMU 120 as shown in FIG. 2A, so as to be substantially collinear with the x-axis and substantially equidistant from right side 150 and left side 155, such that $\vec{r}_{12} = r_x \hat{i}$, may simplify the comparison of the acceleration measured by IMUs 110 and 120 to be:

$$\vec{A}_2 - \vec{A}_1 = \ddot{\psi} \cdot r_x \hat{j} - \ddot{\theta} \cdot r_x \hat{k} - (\dot{\theta}^2 + \dot{\psi}^2) r_x \hat{i} + \dot{\theta} \cdot \dot{\phi} \cdot r_x \hat{j} + \dot{\psi} \cdot \dot{\phi} \cdot r_x \hat{k} \quad (2)$$

Equation (2) can be separated into three equations by collecting terms corresponding to each axis as shown in equations (3)-(5):

$$\hat{i}: A_{2x} - A_{1x} = -(\dot{\theta}^2 + \dot{\psi}^2) r_x \quad (3)$$

$$\hat{j}: A_{2y} - A_{1y} = \ddot{\psi} \cdot r_x + \dot{\theta} \cdot \dot{\phi} \cdot r_x \quad (4)$$

$$\hat{k}: A_{2z} - A_{1z} = \ddot{\theta} \cdot r_x + \dot{\psi} \cdot \dot{\phi} \cdot r_x \quad (5)$$

Equations (3)-(5) may be converted into discrete time cross check equations for detecting an error in one or more of IMUs 110 and 120. For example, equation (3) may be converted into discrete time. Equations (4) and (5) may be integrated and then converted into discrete time. The discrete time cross check equations for the x-, y-, and z-directions are shown as equations (6)-(8), respectively:

$$crosscheck1 = A_{2x}(k) - A_{1x}(k) + \left(\dot{\theta}^2(k) + \dot{\psi}^2(k)\right) r_x \quad (6)$$

$$crosscheck2 = \dot{\psi}(k) - \dot{\psi}(k-n) - \frac{T_s}{r_x} \sum_{i=k-n+1}^{k} (A_{2y}(i) - A_{1y}(i)) \quad (7)$$

$$crosscheck3 = \dot{\theta}(k) - \dot{\theta}(k-n) - \frac{T_s}{r_x} \sum_{i=k-n+1}^{k} (A_{1z}(i) - A_{2z}(i)) \quad (8)$$

where $T_s$ represents a time between discrete time measurements of each of the values in equations (7) and (8). In equations (7) and (8), additional discrete time summations representative of an integral of a product of a roll rate and another rotational rate have been omitted. These summations represent the integral of a product of two small, zero-mean variables, and as such can be neglected in calculating the cross checks.

As can be seen from equations (6)-(8) above, three different cross checks can be performed for IMUs 110 and 120, in three different directions, using only the acceleration values and rotational rate values received from IMUs 110 and 120 and a distance between IMUs 110 and 120. For example, crosscheck1 in the x-axis direction may be calculated based on the x-axis acceleration determined by IMUs 110 and 120, the pitch rate and yaw rates determined by IMUs 110 and 120, and the distance between IMUs 110 and 120. Likewise, crosscheck2 in the y-axis direction may be calculated based on the y-axis accelerations and yaw rate determined by IMUs 110 and 120 and the distance between them. Finally, crosscheck3 in the z-axis direction may be calculated based on the z-axis accelerations and pitch rate determined by IMUs 110 and 120 and the distance between them.

Likewise, positioning first IMU 110 and second IMU 120 as shown in FIG. 2B, so as to be substantially collinear with the y-axis and substantially equidistant from front side 140 and rear side 145, such that $\vec{r}_{12} = r_y \hat{j}$ will simplify the comparison of the accelerations measured by IMUs 110 and 120 to be:

$$\vec{A}_2 - \vec{A}_1 = -\ddot{\psi} \cdot r_y \hat{i} + \ddot{\phi} \cdot r_y \hat{k} - (\dot{\phi}^2 + \dot{\psi}^2) r_y \hat{j} - \dot{\theta} \cdot \dot{\phi} \cdot r_y \hat{i} + \dot{\theta} \cdot \dot{\psi} \cdot r_y \hat{k} \quad (2)$$

Equation (9) can be separated into three equations by collecting teems corresponding to each axis as shown in equations (10)-(12):

$$\hat{i}: A_{2x} - A_{1x} = -\ddot{\psi} \cdot r_y - \dot{\theta} \cdot \dot{\phi} \cdot r_y \quad (10)$$

$$\hat{j}: A_{2y} - A_{1y} = -(\dot{\phi}^2 + \dot{\psi}^2) r_y \quad (11)$$

$$\hat{k}: A_{2z} - A_{1z} = -\ddot{\phi} \cdot r_y + \dot{\theta} \cdot \dot{\psi} \cdot r_y \quad (12)$$

Equations (10)-(12) may be converted into discrete time cross check equations for detecting an error in one or more of IMUs 110 and 120. For example, equation (10) may be converted into discrete time. Equations (11) and (12) may be integrated and then converted into discrete time. The discrete time cross check equations for the x-, y-, and z-directions are shown as equations (13)-(15), respectively:

$$crosscheck1 = \dot{\psi}(k) - \dot{\psi}(k-n) - \frac{T_s}{r_x} \sum_{i=k-n+1}^{k} (A_{1x}(i) - A_{2x}(i)) \quad (13)$$

$$crosscheck2 = A_{2y}(k) - A_{1y}(k) + \left(\dot{\phi}^2(k) + \dot{\psi}^2(k)\right) r_y \quad (14)$$

$$crosscheck3 = \dot{\phi}(k) - \dot{\phi}(k-n) - \frac{T_s}{r_x} \sum_{i=k-n+1}^{k} (A_{2z}(i) - A_{1z}(i)) \quad (15)$$

where $T_s$ represents a time between discrete time measurements of each of the values in equations (14) and (15). In equations (14) and (15), second discrete time summations representative of an integral of a product of a pitch rate and another rotational rate have been omitted. These summations represent the integral of a product of two small, zero-mean variables, and as such can be neglected in calculating the cross checks.

As can be seen from equations (13)-(15) above, three different cross checks can be performed for IMUs 110 and 120, in three different directions, using only the acceleration values and rotational rate values received from IMUs 110 and 120 and a distance between IMUs 110 and 120. For example, crosscheck1 in the x-axis direction may be calculated based on the x-axis acceleration and the yaw rate determined by IMUs 110 and 120 and the distance between them. Likewise, crosscheck2 in the y-axis direction may be calculated based on the y-axis accelerations, pitch rate, and yaw rate determined by IMUs 110 and 120 and the distance between them. Finally, crosscheck3 in the z-axis direction may be calculated based on the z-axis accelerations and roll rate determined by IMUs 110 and 120 and the distance between them.

Error detector 330 may detect an error in first IMU 110 and/or second IMU 120 by comparing measurement data received from first IMU 110 and second IMU 120 using one or more of the cross checks in equations (6)-(8) and (13)-(15), shown above. For example, if IMUs 110 and 120 are positioned as shown in FIG. 2A, error detector 330 may detect an error using one or more of equations (6)-(8). Similarly, if IMUs 110 and 120 are positioned as shown in FIG. 2B, error detector 330 may detect an error using one or more of equations (13)-(15).

Using the positioning in FIG. 2A as an example, IMUs 110 and 120 may send measurement data to error detector 330, e.g., via network 340. For example, first IMU 110 may send x-, y-, and z-axis acceleration data from first x-, y-, and z-axis accelerometers 111-113 and may send a first rotational rate data, e.g., yaw rate data, from first rotational rate sensor 114. Second IMU 120 may send x-, y-, and z-axis acceleration data from second x-, y-, and z-axis accelerometers 121-123 and may send a second rotational data, e.g., pitch rate data, from second rotational rate sensor 124. Error detector 330 may receive the measurement data from IMUs 110 and 120 and may determine whether an error has occurred in first IMU 110 and/or second IMU 120 using one or more of the cross check values of equations (6)-(8). In certain embodiments, error detector 330 may use all three cross check values of equations (6)-(8).

Figure 4:
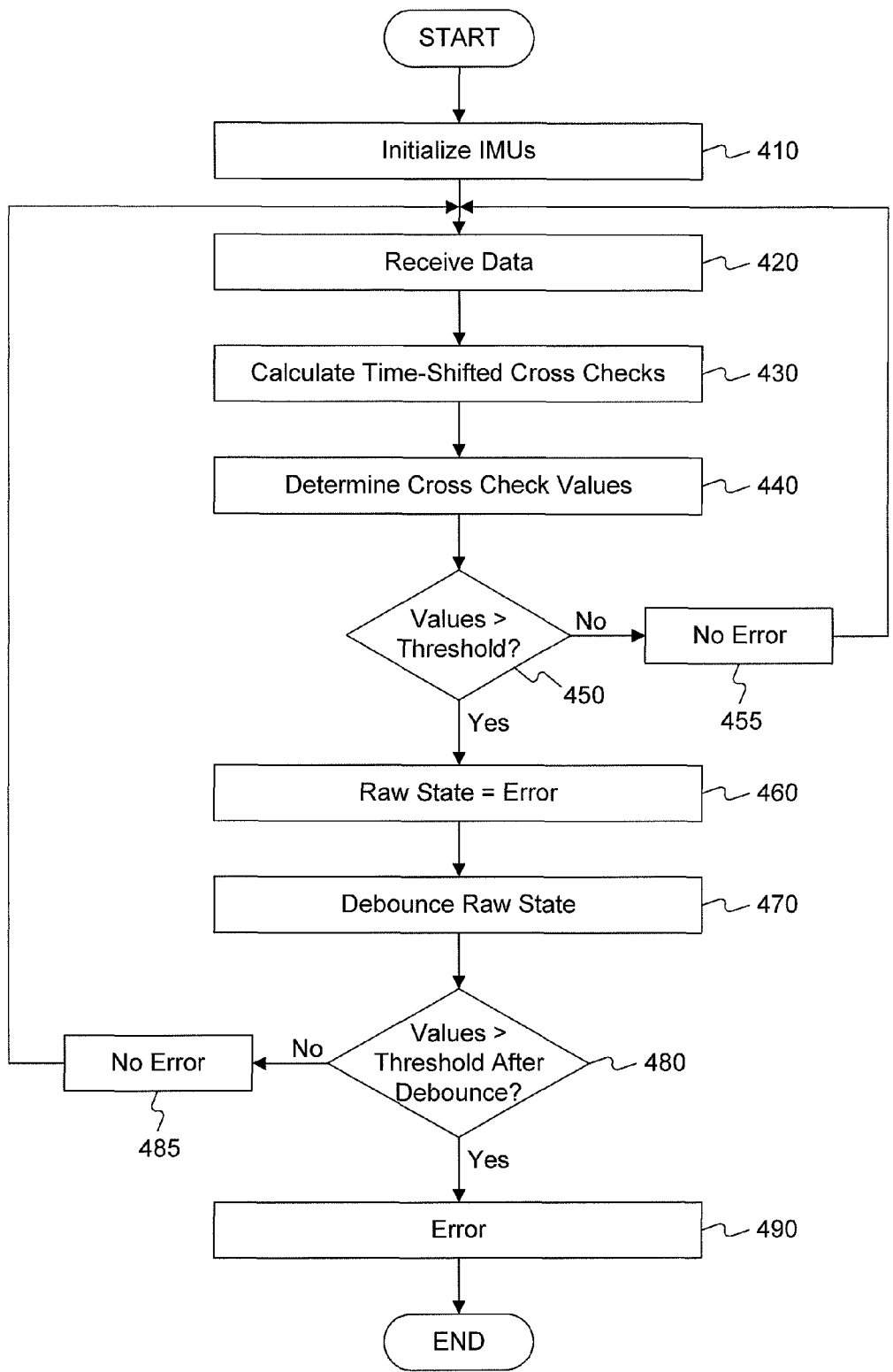
FIG. 4 is a flowchart depicting an exemplary disclosed method performed by the detection system of FIG. 3.

Error detector 330 may calculate one or more of the cross check values of equations (6)-(8) and compare the cross check values to a threshold value. In certain embodiments, the threshold value may be 0 m/s$^2$, or a near-zero acceleration. In other embodiments, the threshold value may be a number greater than zero, such as 2 m/s$^2$, for example, or any other threshold value. The process by which error detector 330 detects an error in one or more of IMUs 110 and 120 is discussed in greater detail below with regard to FIG. 4.

Of course, those skilled in the art will appreciate that error detector 330 may detect errors in IMUs 110 and/or 120 for the orientation of FIG. 2B, similar to the discussion above, using one or more of the cross checks in equations (13)-(15). For example, as discussed above, in the orientation of FIG. 2B, the two rotational rate inputs from IMUs 110 and 120 may include yaw rate data and roll rate data. Moreover, as discussed above, those skilled in the art will appreciate that IMUs 110 and 120 may be positioned such that collinear axis 130 is substantially parallel with the z-axis. In this embodiment, three cross check equations may be used, similar to equations (6)-(8) and (13)-(15).

Industrial Applicability

The disclosed error detection system may detect errors in two IMUs that are placed apart from each other on a machine, using the measurement data of just two IMUs. In one application of machines such as off-highway trucks, the disclosed error detection system may provide for IMU checking without the need for another sensor. The disclosed error detection system may thus allow for accurate detection of IMU errors, even during certain braking scenarios such as four-wheel lock, when a wheel speed measurement does not reflect the true motion of the vehicle, and hence, using a wheel speed sensor to detect IMU errors would return false-positives. The operation of the error detection system will now be explained in connection with the flowchart of FIG. 4.

During operation of machine 100, error detector 330 may initialize IMUs 110 and 120 (step 410). For example, error detector 330 may initialize one or more sensors in IMUs 110 and 120 when machine 100 is stopped. When machine 100 is stopped, first and second rotational rate sensors 114 and 124 should have outputs of zero. Thus, error detector 330 may calibrate the outputs received from first and second rotational rate sensors 114 and 124 to be zero, to account for any possible measurement bias. Error detector 330 may also calibrate first and second x-, y-, and z-axis accelerometers 111-113 and 121-123. For example, error detector 330 may calibrate first x-axis accelerometer 111 and second x-axis accelerometer 121 such that the outputs received are set to an average value of the two outputs from first and second x-axis accelerometers 111 and 121 when machine 100 is stopped. Error detector 330 may calibrate first and second y- and z-axis accelerometers 112-113 and 122-123 in a similar fashion. Of course, other values, such as the minimum or maximum value between the first and second x-, y-, or z-axis accelerometers may be used. This may account for any measurement bias from the accelerometers.

After IMUs 110 and 120 are initialized, error detector 330 may begin receiving measurement data from first IMU 110 and second IMU 120 (step 420). For example, error detector 330 may receive acceleration data along the x-, y-, and z-axes from each of IMUs 110 and 120, and may receive rotational rate data about an axis from each of IMUs 110 and 120. In an embodiment where IMUs 110 and 120 are positioned as shown in FIG. 2A, the first rotational rate data received from first IMU 110 may be yaw rate data and the second rotational rate data received from second IMU 120 may be pitch rate data. In an embodiment where IMUs 110 and 120 are positioned as shown in FIG. 2B, the first rotational rate data received from first IMU 110 may be yaw rate data and the second rotational rate data received from second IMU 120 may be roll rate data. The measurement data received by error detector 330 from IMUs 110 and 120 may include continuous time signals and/or may include discrete time signals received at certain time intervals.

In certain embodiments error detector 330 may calculate one or more time-shifted cross checks (step 430). That is, for each cross check equation used, error detector 330 may calculate the cross check value multiple times while varying the relative delay of the measurement data signals received from IMUs 110 and 120. For example, in one embodiment, error detector 330 may calculate the cross check value three times for each equation being used: once where the signals received from first IMU 110 are delayed a predetermined time interval with respect to those received from second IMU 120; once where the signals from second IMU 120 are delayed by the same time interval with respect to the signals from first IMU 110; and once without any relative delay.

As discussed above, error detector 330 may use one or more of the cross checks in equations (6)-(8) (or (13)-(15) for the embodiment of FIG. 2B) when detecting errors in IMUs 110 and 120. Thus, if error detector 330 is using all three equations (6)-(8), error detector 330 may calculate three time-shifted cross checks for each of equations (6)-(8) in step 430.

Error detector 330 may determine cross check values based on the time-shifted cross checks (step 440). For example, if three time-shifted cross checks are calculated for each equation, error detector 330 may determine a cross check value based on the three time-shifted cross checks. Error detector 330 may determine the cross check value to be a minimum of the three-time shifted cross checks, an average of the three time-shifted cross checks, a maximum of the three-time shifted cross checks, etc.

Of course, in an embodiment where error detector only calculates one time-shifted cross check, e.g., a single cross check with a time shift of zero, for each equation being used, then error detector may determine that the cross check value is equal to the determined cross check from step 430, and step 440 may not be necessary.

After error detector 330 determines the cross check values, it may compare the cross check values to one or more threshold values (step 450). For example, if error detector 330 determines a cross check value for each of equations (6)-(8), then error detector 330 may compare each cross check value to a corresponding threshold value. As discussed above, the threshold values may be zero, near-zero, or may be any other number, e.g., 2 m/s$^2$. In certain embodiments, each cross check may have a different corresponding threshold.

If error detector 330 determines that none of the equations exceed a threshold value (step 450, No), then error detector 330 may determine that IMUs 110 and 120 are functioning properly and may determine that there is no error (step 455). In this case, error detector 330 may return to step 420 to repeat steps 420-450 for a subsequent iteration of measurement data. In this way, error detector 330 may continuously cross check measurement data from IMUs 110 and 120 at predetermined time intervals, e.g., every 10 ms.

If, on the other hand, error detector 330 determines that one or more equations exceed a threshold value (step 450, Yes), error detector 330 may determine a raw state to be in an error state (step 460). This may be accomplished, e.g., by changing a bit corresponding to a raw state from 0 to 1. Error detector 330 may then debounce the raw state for a predetermined length of time, e.g., approximately 0.5 seconds (step 470). During the debounce period, error detector 330 may receive additional measurement data, calculate additional time-shifted cross checks, determine additional cross check values, and compare those cross check values to a threshold value, similar to the process shown in steps 420-440.

If, during the debounce period and at the end of the debounce period, error detector 330 determines that the cross check value(s) still exceed the corresponding threshold value(s) (step 480, Yes), then error detector 330 may enter an error state (step 490). The error state may result in shutting down machine 100, sending an error to an operator of machine 100, resetting and reinitializing IMUs 110 and 120, or any other action consistent with disclosed embodiments. In certain embodiments, machine 100 may continue to operate and error detector 330 may continue to receive data from IMUs 110 and 120 and compare the data, as discussed above with respect to steps 420-480.

If, on the other hand, error detector 330 determines that the values measured during or after the debounce period no longer exceed the threshold value (step 480, No), error detector 330 may reset the raw state to no error (step 490), and may return to step 420 to continue receiving and comparing measurement data from IMUs 110 and 120. In this way, error detector 330 may continuously cross check measurement data from IMUs 110 and 120 at predetermined time intervals, e.g., every 10 ms.

It will be apparent to those skilled in the art that various modifications and variations can be made to the disclosed error detection system. Other embodiments will be apparent to those skilled in the art from consideration of the specification and practice of the disclosed error detection system. It is intended that the specification and examples be considered as exemplary only, with a true scope being indicated by the following claims and their equivalents.

What is claimed is:

1. A system for detecting an error in an inertial measurement unit comprising:
    a first inertial measurement unit including:
        a first plurality of accelerometers configured to measure acceleration along a plurality of first axes, a first axis of the plurality of first axes being substantially collinear with a collinear axis; and
        a first rotational rate measurer configured to measure a first rotational rate about a second axis of the plurality of first axes that is substantially perpendicular to the collinear axis;
    a second inertial measurement unit including:
        a second plurality of accelerometers configured to measure acceleration along a plurality of second axes, a first axis of the plurality of second axes being substantially collinear with the collinear axis; and
        a second rotational rate measurer configured to measure a second rotational rate about a second axis of the plurality of second axes that is substantially perpendicular to the collinear axis; and
    an inertial measurement unit error detector configured to:
        receive measurement data from the first inertial measurement unit and the second inertial measurement unit, the measurement data including:
            first acceleration data measured along the collinear axis by the first inertial measurement unit,
            first rotational rate data corresponding to the first rotational rate
            second acceleration data measured along the collinear axis by the second inertial measurement unit, and
            second rotational rate data corresponding to the second rotational rate; and
        detect a first inertial measurement unit error along the collinear axis based on the first and second acceleration data and the first and second rotational rate data.

2. The system according to claim 1, further including:
    a machine, wherein the collinear axis is substantially in a direction of forward movement of the machine.

3. The system according to claim 1, further including:
    a machine, wherein the collinear axis is substantially perpendicular to a direction of forward movement of the machine.

4. The system according to claim 1, wherein the second axis of the plurality of first axes is substantially perpendicular to the second axis of the plurality of second axes.

5. The system according to claim 1, further including:
    a machine, wherein the first inertial measurement unit and the second inertial measurement unit are mounted on the machine such that an angular variation perpendicular to the collinear axis between the first inertial measurement unit and the second inertial measurement unit is less than or equal to 7.5 degrees.

6. The system according to claim 1, wherein
    the measurement data received by the inertial measurement unit error detector further includes:
        third and fourth acceleration data measured along the second axis and a third axis, respectively, of the plurality of first axes by the first inertial measurement unit, and
        fifth and sixth acceleration data measured along the second axis and a third axis, respectively, of the plurality of second axes by the second inertial measurement unit; and
    the inertial measurement unit error detector is further configured to:
        detect a second inertial measurement unit error based on the third and sixth acceleration data and the first and second rotational rate data, and
        detect a third inertial measurement unit error based on the fourth and fifth acceleration data and the first and second rotational rate data.

7. The system according to claim 1, wherein the inertial measurement unit does not require data from any other inertial measurement unit or sensor in order to detect the first inertial measurement unit error.

8. A method for detecting an error in an inertial measurement unit comprising:
    receiving first measurement data from a first inertial measurement unit, the measurement data including first acceleration data in first, second, and third directions and first rotational rate data;
    receiving second measurement data from a second inertial measurement unit that is separated by a distance from the first inertial measurement unit, the second measurement data including second acceleration data in the first, second, and third directions and a second rotational rate data;
    determining whether an error has occurred in the first or second inertial measurement units using the first and second acceleration data, the first and second rotational rate data, and the distance between the first inertial measurement unit and the second inertial measurement unit.

9. The method according to claim 8, wherein determining whether the error has occurred does not use data from any inertial measurement units or sensors other than the first and second inertial measurement units.

10. The method according to claim 8, determining whether the error has occurred including:
- calculating a cross check value for each of the first, second, and third directions based on the first and second acceleration data, the first and second rotational rate data, and the distance between the first inertial measurement unit and the second inertial measurement unit;
- comparing the cross check value for each of the first, second, and third directions to a first, second, and third threshold value, respectively; and
- determining that the error may have occurred if the cross check value for any of the first, second, or third directions exceeds the first, second, or third threshold value, respectively.

11. The method according to claim 10, the determining step further including:
- debouncing a state value for a debounce time period when it is determined that the error may have occurred; and
- determining that the error has occurred if the cross check value for any of the first, second, or third directions exceeds the first, second, or third threshold value, respectively, after the debounce time period.

12. The method according to claim 10, wherein the cross check value for the first, second, and third directions are calculated according to the following equations, respectively:

first direction: $crosscheck1 = A_{2x}(k) - A_{1x}(k) + (\dot{\theta}^2(k) + \dot{\psi}^2(k))r_x;$ second direction: $crosscheck2 =$ $$\dot{\psi}(k) - \dot{\psi}(k-n) - \frac{T_s}{r_x} \sum_{i=k-n+1}^{k} (A_{2y}(i) - A_{1y}(i));$$

and third direction: $crosscheck3 = \dot{\theta}(k) - \dot{\theta}(k-n) - \frac{T_s}{r_x} \sum_{i=k-n+1}^{k} (A_{1z}(i) - A_{2z}(i)).$ 13. The method according to claim 10, wherein the cross check value for the first, second, and third directions are calculated according to the following equations, respectively:

first direction: $crosscheck1 =$ $$\dot{\psi}(k) - \dot{\psi}(k-n) - \frac{T_s}{r_x} \sum_{i=k-n+1}^{k} (A_{1x}(i) - A_{2x}(i));$$

second direction: $crosscheck2 = A_{2y}(k) - A_{1y}(k) + (\dot{\theta}^2(k) + \dot{\psi}^2(k))r_y;$ and third direction: $crosscheck3 = \dot{\phi}(k) - \dot{\phi}(k-n) - \frac{T_s}{r_x} \sum_{i=k-n+1}^{k} (A_{2z}(i) - A_{1z}(i)).$ 14. A system for detecting an error in an inertial measurement unit comprising:
- a first inertial measurement unit that generates first acceleration data in first, second, and third directions and first rotational rate data;
- a second inertial measurement unit that is separated by a distance from the first inertial measurement unit and that generates second acceleration data in the first, second and third directions and second rotational rate data; and
- an error detector configured to:
  - receive the first acceleration data and the first rotational rate data from the first inertial measurement unit and the second acceleration data and the second rotational rate data from the second inertial measurement unit; and
  - determine whether an error has occurred using the first and second acceleration data, the first and second rotational rate data, and the distance between the first inertial measurement unit and the second inertial measurement unit.

15. The system according to claim 14, the error detector being further configured to determine whether the error has occurred without using data from any inertial measurement units or sensors other than the first and second inertial measurement units.

16. The system according to claim 14, the error detector being further configured to:
- calculate a cross check value for each of the first, second, and third directions based on the first and second acceleration data, the first and second rotational rate data, and the distance between the first inertial measurement unit and the second inertial measurement unit;
- compare the cross check value for each of the first, second, and third directions to a first, second, and third threshold value, respectively; and
- determine that an error may have occurred if the cross check value for any of the first, second, or third directions exceeds the first, second, or third threshold value, respectively.

17. The system according to claim 16, the error detector being further configured to:
- debounce a state value for a debounce time period when it is determined that the error may have occurred; and
- determine that an error has occurred if the cross check value for any of the first, second, or third directions exceeds the first, second, or third threshold value, respectively, after the debounce time period.

18. The system according to claim 16, the error detector being further configured to calculate the cross check value for the first, second, and third directions according to the following equations, respectively:

first direction: $crosscheck1 = A_{2x}(k) - A_{1x}(k) + (\dot{\theta}^2(k) + \dot{\psi}^2(k))r_x;$ second direction: $crosscheck2 =$ $$\dot{\psi}(k) - \dot{\psi}(k-n) - \frac{T_s}{r_x} \sum_{i=k-n+1}^{k} (A_{2y}(i) - A_{1y}(i));$$

and third direction: $crosscheck3 = \dot{\theta}(k) - \dot{\theta}(k-n) - \frac{T_s}{r_x} \sum_{i=k-n+1}^{k} (A_{1z}(i) - A_{2z}(i)).$ 19. The system according to claim 16, the error detector being further configured to calculate the cross check value for the first, second, and third directions according to the following equations, respectively:

first direction: $$crosscheck1 = \dot{\psi}(k) - \dot{\psi}(k-n) - \frac{T_s}{r_x} \sum_{i=k-n+1}^{k} (A_{1x}(i) - A_{3x}(i));$$

second direction: $$crosscheck2 = A_{3y}(k) - A_{1y}(k) + (\dot{\phi}^2(k) + \dot{\psi}^2(k))r_y;$$

and third direction: $$crosscheck3 = \dot{\phi}(k) - \dot{\phi}(k-n) - \frac{T_s}{r_x} \sum_{i=k-n+1}^{k} (A_{3z}(i) - A_{1z}(i)).$$

* * * * *

UNITED STATES PATENT AND TRADEMARK OFFICE
CERTIFICATE OF CORRECTION

PATENT NO.        : 8,812,233 B2                                    Page 1 of 1
APPLICATION NO.   : 13/337414
DATED             : August 19, 2014
INVENTOR(S)       : Kontz et al.

It is certified that error appears in the above-identified patent and that said Letters Patent is hereby corrected as shown below:

In the Specification

Column 5, line 15, delete " $\dot{\theta}$ " and insert -- $\dot{\phi}$ --.

Column 7, line 67, after " $\vec{A}_2 - \vec{A}_1 = -\ddot{\psi} \cdot r_y \hat{i} + \ddot{\phi} \cdot r_y \hat{k} - (\dot{\phi}^2 + \dot{\psi}^2) r_y \hat{j} - \dot{\theta} \dot{\phi} \cdot r_y \hat{j} + \dot{\theta} \dot{\psi} \cdot r_y \hat{k}$ " delete "(2)" and insert -- (9) --.

Column 8, line 2, delete "teems" and insert -- terms --.

Column 8, line 9, delete " $\hat{k}: A_{2z} - A_{1z} = -\ddot{\phi} \cdot r_y + \dot{\theta} \dot{\psi} \cdot r_y$ " and insert -- $\hat{k}: A_{2z} - A_{1z} = \ddot{\phi} \cdot r_y + \dot{\theta} \dot{\psi} \cdot r_y$ --.

In the Claims

Column 12, line 4, in Claim 1, delete "rate" and insert -- rate, --.

Signed and Sealed this
Fifteenth Day of September, 2015

Michelle K. Lee
*Director of the United States Patent and Trademark Office*